(12) United States Patent
Englund et al.

(10) Patent No.: US 10,710,014 B2
(45) Date of Patent: Jul. 14, 2020

(54) HIGH TEMPERATURE FILTER ASSEMBLY

(71) Applicant: Camfil AB, Stockholm (SE)

(72) Inventors: Fredrik Englund, Vagnhärad (SE); Sverker Hugert, Trosa (SE)

(73) Assignee: CAMFIL AB, Stockholm (SE)

( * ) Notice: Subject to any disclaimer, the term of this patent is extended or adjusted under 35 U.S.C. 154(b) by 53 days.

(21) Appl. No.: 15/740,333

(22) PCT Filed: Jul. 10, 2015

(86) PCT No.: PCT/EP2015/065814
§ 371 (c)(1),
(2) Date: Dec. 27, 2017

(87) PCT Pub. No.: WO2017/008827
PCT Pub. Date: Jan. 19, 2017

(65) Prior Publication Data
US 2018/0193784 A1    Jul. 12, 2018

(51) Int. Cl.
*B01D 46/00* (2006.01)
*B01D 46/52* (2006.01)
*B01D 39/20* (2006.01)

(52) U.S. Cl.
CPC ..... *B01D 46/0005* (2013.01); *B01D 39/2017* (2013.01); *B01D 46/0002* (2013.01);
(Continued)

(58) Field of Classification Search
CPC ............ B01D 46/0005; B01D 39/2017; B01D 46/0002; B01D 46/623; B01D 2265/06;
(Continued)

(56) References Cited

U.S. PATENT DOCUMENTS

| B408,749 I5 | 1/1975 | Westlin |
|---|---|---|
| 4,199,387 A | 4/1980 | Hladik |

(Continued)

OTHER PUBLICATIONS

International Search Report and Written Opinion for International Application No. PCT/EP2015/065814 dated Apr. 22, 2016 in 18 pages.

(Continued)

*Primary Examiner* — Minh Chau T Pham
(74) *Attorney, Agent, or Firm* — Knobbe, Martens, Olson & Bear LLP (57) ABSTRACT

A high efficiency air filter assembly (100) for high temperature applications including: a filter core (102) including a unitary sheet of air-permeable filter media folded in accordion fashion to form a plurality of side-by-side pleats with zig-zag edges on two opposite sides and flat panels on the other two sides, and a spacer member between opposing walls of successive pleats, a box-like metal frame (108) enclosing said filter core on four sides in air tight engagement to define an air flow opening extending between upstream and downstream sides of said assembly, wherein the zig-zag edges of the unitary sheet of air-permeable filter media are sealingly embedded in a solid inorganic sealant composition (118) in the frame, and wherein the unitary sheet of air-permeable filter media preferably consists of a binder-free glass or mineral fiber filter media. Use of the high efficiency air filter assembly in high temperature applications wherein the filter assembly is repeatedly or continuously heated to a temperature in the range of 200-500° C.

26 Claims, 6 Drawing Sheets

(52) U.S. Cl.
CPC ......... *B01D 46/523* (2013.01); *B01D 46/526* (2013.01); *B01D 2201/0415* (2013.01); *B01D 2201/127* (2013.01); *B01D 2201/605* (2013.01); *B01D 2265/04* (2013.01); *B01D 2265/06* (2013.01); *B01D 2273/20* (2013.01)

(58) Field of Classification Search
CPC ...... B01D 2201/0415; B01D 2201/605; B01D 2265/04; B01D 2201/127; B01D 2273/20; B01D 46/523; B01D 46/522; B01D 46/0013; B01D 46/0008; B01D 46/0001; B01D 46/526
USPC .......... 55/497, 498, 500, 502, 521, DIG. 31; 156/227, 257, 292, 298; 428/120, 182, 428/184

See application file for complete search history.

(56) References Cited

U.S. PATENT DOCUMENTS

| | | | | | |
|---|---|---|---|---|---|
| 4,227,953 | A | * | 10/1980 | Wasielewski | B01D 46/12 156/227 |
| 4,537,812 | A | * | 8/1985 | Elbers | B01D 46/0001 428/182 |
| 4,600,419 | A | * | 7/1986 | Mattison | B01D 46/001 55/484 |
| 4,795,481 | A | * | 1/1989 | Ellis | B01D 46/10 55/500 |
| 4,885,015 | A | * | 12/1989 | Goulet | B01D 46/0001 55/497 |
| 6,387,143 | B1 | * | 5/2002 | Adiletta | B01D 46/10 55/497 |
| 6,419,729 | B1 | * | 7/2002 | Duffy | B01D 39/163 55/385.6 |
| 2002/0144942 | A1 | * | 10/2002 | Denton | B01D 17/00 210/315 |
| 2009/0078637 | A1 | * | 3/2009 | Shane | B01D 39/1623 210/243 |
| 2011/0289894 | A1 | * | 12/2011 | Nicholas | B01D 46/023 55/486 |

OTHER PUBLICATIONS

Chinese Office Action for Chinese Application No. 201610543308.X dated Feb. 1, 2018 in 6 pages.

* cited by examiner

HIGH TEMPERATURE FILTER ASSEMBLY

FIELD OF THE INVENTION

The present invention relates to high efficiency air filters, and more specifically to a filter core and frame assembly suitable for use in high temperature environments.

BACKGROUND

Air filters of the so-called HEPA type are required to operate with a minimum 99.95% efficiency in removing airborne particles. In a popular construction of such filters, a filter core is formed of a continuous sheet of filter media folded in zig-zag fashion to form a plurality of accordion pleats of uniform size with thin, corrugated, spacer sheets placed between the opposing walls of each pleat. The filter core is supported by a surrounding, box-like frame with which the media is sealingly engaged about its entire periphery, including both pleat ends and the entire length of both media edges. The integrity of the seal between filter core and frame is critical in preventing unfiltered air from bypassing the filter.

In some applications, air filters of this type are installed in locations where they are exposed to high temperatures, e.g., on the order of 200-500° C. Problems which have been encountered with typical filter assemblies employed under such conditions include separation of and consequent air leakage between sealers and frame members, cracking of sealers, and powdering or crumbling of adhesive. These problems may be due both to the high temperatures and to poor structural strength of the filter assembly, resulting from dissimilar rates of thermal expansion, poor adhesion and low strength. Problems are particularly noticeable in applications where filter are subjected to extended periods of repeated cycling between low temperature (for example about 25° C.) and high temperature (for example in the range of 200-500° C.).

An early approach to the problem of providing the required sealing between the filter core and frame which is capable of withstanding high temperatures is that disclosed in U.S. Pat. No. 2,884,091 of Baldwin. In this construction, a resilient mat or blanket of fine glass fibers is compressed between the filter core and a surrounding metal frame. However, after prolonged exposure to temperature approaching 1000° F. the glass fibers begin to anneal, causing the mat to lose resiliency and eventually resulting in air leakage between the filter core and frame. Another filter construction intended for high temperature applications is that disclosed in U.S. Pat. No. 4,199,387 of Hladik, involving the application of a ceramic adhesive with a trowel to the zig-zag edges of the media and interposed spacer members. With this method, it is difficult to obtain a uniform sealant depth and uniformity, which could lead to leakages or undue blockage of media.

Filter constructions and methods of assembly which include immersion of the zig-zag edges of the media in a liquid sealant which later hardens to form a seal between the media and frame are shown in U.S. Pat. No. 3,581,479 of Goulet, and U.S. Pat. No. 4,227,953 of Wasielewski and Hladik. In the former, a groove or channel is formed across the inner surfaces of the top and bottom frame members for insertion of an elongated nozzle through which a liquid adhesive is injected as the nozzle is withdrawn from the groove. The assembly method of the latter patent involves filling shallow pans with the liquid adhesive and immersing therein the zig-zag edges of the pleated media. The bottom members of the shallow pans become the ends of the filter casing, and side members are adhesively sealed to the end media pleats and attached to the end members of the casing.

In order to provide HEPA filters in high filter classes, such as e.g. HEPA class H13 or higher, which filters are capable of retaining their high filtering efficiency over an extended period at high temperature, and particularly when subjected to repeated cycling between low temperature (for example about 25° C.) and high temperature (for example in the range of 200-500° C.), new filter constructions and manufacturing methods are required.

SUMMARY OF THE INVENTION

The principal object of the present invention is to provide a HEPA air filter construction which retains its structural rigidity and filtering efficiency when exposed to high temperatures for relatively long time periods, and particularly when subjected to repeated cycling between low temperature (for example about 25° C.) and high temperature (for example in the range of 200-500° C.).

Another object is to provide a high efficiency air filter having improved means, effective at both normal and high temperatures, for maintaining an accordion pleated filter media in sealed engagement about its entire periphery with a surrounding frame.

A further object is to provide an air filter frame construction having improved features enhancing the ability of the frame to be placed and maintained in sealing engagement with a pleated filter core by means of a sealant initially in liquid form and hardenable to an air-impervious solid.

Another object is to provide a high efficiency air filter which does not require burn-in or which requires minimal burn-in following installation.

The present inventors have found that with prior art high temperature filter assembly types, it has proven difficult to achieve high filtering efficiency, e.g. HEPA class H13 or higher according to European Norm EN 1822:2009, and particularly to maintain a high filtering efficiency over an extended period of use at temperatures in the range 200-500° C. Standard glass fiber HEPA filter media typically contains at least 5-9% by weight of an organic resin binder, e.g. an acrylic binder. Burn-in of conventional glass fiber based HEPA filter media comprising organic binder results in loss of mechanical strength of the media. The loss of material in such filters during burn-in may also lead to deteriorated or undefined filtration efficiency in the end product.

In some high temperature filters, the zig-zag ends of the pleated glass fiber based HEPA filter media comprising organic binder are sealed to the frame by an inorganic/ceramic potting composition. The present inventors have found that to achieve high filtering efficiency, the joint between the filter media and the inorganic/ceramic potting composition is critical. Burn-in of a glass fiber based HEPA filter media comprising organic binder, embedded in an inorganic/ceramic potting composition, can adversely affect the integrity of the joint, potentially resulting in leaks. Furthermore, in prior art solutions using ceramic cements, it has been found that cracks may develop in the ceramic cement from heat and dryness in combination with mechanical stress, resulting in unsatisfactory results.

It is an object of the present invention to address at least some of the deficiencies associated with prior art high temperature filter assembly types.

According to aspects illustrated herein, there is provided a high efficiency air filter assembly for high temperature applications comprising:

a filter core including a unitary sheet of air-permeable filter media folded in accordion fashion to form a plurality of side-by-side pleats with zig-zag edges on two opposite sides and flat panels on the other two sides, and a spacer member between opposing walls of successive pleats, a box-like metal frame enclosing said filter core on four sides in air tight engagement to define an air flow opening extending between upstream and downstream sides of said assembly, wherein the zig-zag edges of the unitary sheet of air-permeable filter media are sealingly embedded in a solid inorganic sealant composition in the frame.

The unitary sheet of air-permeable filter media preferably consists of a binder-free glass or mineral fiber filter media. The binder-free glass or mineral fiber filter media is preferably prepared from glass or mineral fibers without addition of organic binders, strengthening agents or additives commonly used for binding the fibers of the media together. This means that the media is substantially free of any binders, strengthening agents or additives commonly used for binding the fibers of the media together. By "substantially free" it is meant that the mineral fiber filter media comprises no more than 2% by weight, preferably no more than 1% by weight, and more preferably no more than 0.5% by weight, of such binders, strengthening agents or additives. The media used in the present invention is preferably made of 100% glass or mineral fiber and free of binders.

Embodiments of the invention provide several advantages over prior art solutions. As an example, the use of a binder-free glass or mineral fiber filter media sealingly embedded in a solid inorganic sealant composition is superior to glass or mineral fiber based HEPA filter media comprising organic binder, embedded in an inorganic/ceramic potting composition, since the former will not deteriorate due to loss of the organic binder material in the joints during burn-in. It also provides a filter which does not require burn-in and which can be provided with a high and well defined filtration efficiency, which does not deteriorate significantly over an extended period of use at high temperature, or when subjected to repeated cycling between low temperature (for example about 25° C.) and high temperature (for example in the range of 200-500° C.).

Filters according to the present disclosure are useful for protection of ultra-clean processes operating at high temperatures, for example HEPA filter sterilization and depyrogenation ovens and tunnels in pharmaceutical processing, among other applications.

According to some embodiments, the binder-free glass or mineral fiber filter media is a glass fiber filter media made of binder-free borosilicate glass fiber. The filter media is preferably a wet-laid glass or mineral fiber filter media.

The spacer members may for example be provided in the form of thin corrugated or pleated sheets or foils. The spacer members keep the pleats separated and help distribute the air flow evenly over the filter media surface with a minimal blockage of the filter media. The spacer members can for example be made of stainless steel or aluminum. Preferably, the spacer members are made of stainless steel.

The inorganic sealant composition can preferably be a geopolymer composition.

The inorganic sealant composition can preferably be provided in a liquid state, hardenable to a solid state. According to some embodiments, the inorganic sealant composition is a geopolymer composition which can be provided in a liquid state, hardenable to a solid state.

The filter core is mounted within the frame in such manner as to positively prevent bypassing or leakage of particles, around the filter core. It will be appreciated that air containing particulate matter, if permitted to bypass the filter core, would destroy the effectiveness of the filter.

The filter assembly preferably comprises box-like metal frame enclosing said filter core on four sides in an air tight, or at least particle tight, engagement.

The box-like metal frame is preferably substantially air tight, at least when the filter assembly is assembled. The substantially air tight, or at least particle tight, engagement can be achieved through the use of various sealing means, for example the inorganic sealant composition and a compressible heat resistant fibrous material, forming an air tight, or at least particle tight, seal between the filter core and the frame.

According to some embodiments, the filter core and solid inorganic sealant composition are resiliently suspended within the frame. Preferably, the filter core and solid inorganic sealant composition can move resiliently in relation to the frame.

In the present invention, the filter core is embedded and fixed in a solid inorganic sealant composition such that the filter core and solid inorganic sealant composition form a unit. This filter core and solid inorganic sealant composition unit may preferably be suspended in a resilient or flexible manner within the frame such that the filter core and solid inorganic sealant composition unit can move resiliently within the frame in a plane substantially orthogonal to the general air flow direction. The resilient suspension reduces or substantially eliminates detrimental mechanical stress on the inorganic sealant composition, the filter media, and on the joint between the inorganic sealant composition and the filter media, due to thermal expansion of the metal frame during at high temperatures.

According to some embodiments, the resilient suspension between said filter core and solid inorganic sealant composition is provided by a compressible heat resistant fibrous material arranged between the solid inorganic sealant composition and the frame and between the flat panel sides of the filter core and the frame. The compressible heat resistant fibrous material may preferably be provided in the form of a compressible mat of heat resistant fibrous material of suitable size.

In order to form an effective mounting of the filter core which will seal the filter core within the frame and prevent bypassing of unfiltered air, and which may withstand high temperature gases, a compressible mat of a heat resistant fibrous material is arranged between the filter core and the frame. The compressible heat resistant fibrous material is arranged between the solid inorganic sealant composition and the frame and between the flat panel sides of the filter core and the frame.

The compressible heat resistant fibrous material is composed of extremely fine mineral fibers, and is dense enough, also at high temperatures with associated thermal expansion of the metal frame, to prevent air and associated particulate contaminants to pass. The compressible heat resistant fibrous material when arranged in the filter assembly is compressed in thickness to at least about half of its original thickness, preferably to about one fourth of its original thickness. Because the heat resistant fibrous material is compressed, it is capable of expanding when the metal frame expands, thereby providing a flexible seal between the filter core and the frame.

According to some embodiments, the heat resistant fibrous material substantially consists of glass or aluminum oxide fibers or a combination thereof, preferably the heat resistant fibrous material substantially consists of aluminum oxide fibers. Aluminum oxide fibers are preferred to glass fibers in the heat resistant fibrous material, since aluminum oxide fibers better retain their flexibility over extended periods of use at high temperatures. Alumina fibers are high-purity polycrystalline fibers designed for use in applications up to 1600° C., Alumina fibers can be produced with high levels of chemical purity and low levels of shot content (non-fibrous particles). The fiber diameter can be strictly controlled with a median of approximately 3 microns with very low levels of fiber less than 1 micron in diameter.

In some embodiments, the heat resistant fibrous material arranged between the solid inorganic sealant composition and the frame is sealed between the solid inorganic sealant composition and the frame, such that the heat resistant fibrous material is not directly exposed to the downstream side of the filter assembly. Furthermore, in some embodiments, the heat resistant fibrous material arranged between the flat panel sides of the filter core and the frame are enveloped by the unitary sheet of air-permeable filter media, such that the heat resistant fibrous material is not directly exposed to the downstream side of the filter assembly. This arrangement prevents any particulate residues from the heat resistant fibrous material from reaching the downstream side of the filter assembly.

In the present disclosure, the zig-zag side of the filter core is embedded in the solid inorganic sealant composition. This can be achieved by substantially filling a recess of an end casing with a inorganic sealant composition in a liquid state, hardenable to a solid state, inserting the filter core into the recess of the end casing such that a zig-zag edge of the filter core is fully immersed in the inorganic sealant, and then allowing the inorganic sealant to harden to a solid state. This method allows for use of a relatively low viscosity inorganic sealant which permits control over the immersion depth of the zig-zag edge to provide an even sealing without undue blockage of the filter media. The present inventors have found that it is important to avoid direct contact between the inorganic sealant and the metal frame, and to provide a resilient or flexible intermediate layer between the metal and the inorganic sealant. The present inventors have found that this effect can be obtained by the provision of thin layer of a flexible material, or liner. Thus, according to some embodiments, the inorganic sealant composition is separated from the frame by a flexible liner. Preferably, the filter assembly may comprise a flexible liner arranged at an inner surface of the frame, said flexible liner preventing direct contact between the inorganic sealant composition and the frame and providing a resilient contact between the inorganic sealant composition and the frame, such that the support frame can expand on heating without subjecting the inorganic sealant to mechanical stress. According to a preferred embodiment, the flexible liner is comprised of a sheet of HEPA filter media.

The high efficiency air filter assembly according to the invention retains its structural rigidity and high filtering efficiency even when exposed to high temperatures for relatively long time periods, particularly when subjected to repeated cycling between low temperature (for example about 25° C.) and high temperature (for example in the range of 200-500° C.).

According to some embodiments, the high efficiency air filter assembly of the present invention is HEPA class H13 or higher according to European Norm EN 1822:2009. The air filter assembly is also preferably capable of maintaining a HEPA class of H13 or higher according to European Norm EN 1822:2009, over an extended period of use at temperatures in the range 200-500° C.

According to some embodiments, the box-like metal frame of the air filter assembly comprises a pair of substantially identical, rectangular side casings having a recess configured to receive a flat panel side of the filter core and having a lip of lesser width than said side casings extending outwardly from each end thereof, and a pair of substantially identical, rectangular end casings having a width equal to the width of said side casings and having a recess configured to receive a zig-zag side of the filter core. The box-like metal frame is preferably air tight, at least when the filter assembly is assembled.

In order to insure that the filter core and solid inorganic sealant composition can move resiliently in relation to the frame, it has been found that the recesses of the box-like metal frame should preferably have substantially smooth inner surfaces. According to some embodiments, the length of the lips of the side casings substantially corresponds to the depth of the recesses of the end casings. This configuration provides a substantially smooth inner surface at the point of contact between the sides casing of the frame and the inorganic sealant, which prevents snagging and possible cracking of the inorganic sealant due to thermal expansion of the metal frame at high temperatures.

Stainless steel is the preferred material for the frame, as well as the spacer elements. Thus, according to some embodiments, the box-like metal frame is formed of stainless steel.

It has been found that the solid inorganic sealant composition may be damaged if the frame is subjected to deformation, e.g. torsional deformation during handling, transport or mounting. Box-like filters are typically mounted by clamping against a sealing frame of a filter housing, e.g., using a number of bolts or the like. Incorrect or uneven clamping could subject the filter frame to torsional forces, leading to torsional deformation and possible damage to the solid inorganic sealant composition. In order to reduce the risk of damage to the solid inorganic sealant composition, the frame of the air filter assembly may be provided with a reinforcement structure for preventing deformation.

According to some embodiments, the box-like metal frame comprises a reinforcement structure, said reinforcement structure comprising a first unitary rectangular plate arranged around the periphery of the upstream side of the filter assembly and fixed to all four sides of the metal frame such that torsional deformation of the metal frame is prevented.

According to some embodiments, the box-like metal frame comprises a reinforcement structure, said reinforcement structure comprising a second unitary rectangular plate arranged around the periphery of the downstream side of the filter assembly and fixed to all four sides of the metal frame such that torsional deformation of the metal frame is prevented.

According to some embodiments, the box-like metal frame comprises a reinforcement structure, said reinforcement structure further comprising at least two reinforcement bars arranged at different sides of the metal frame, each reinforcement bar extending between, and being rigidly fixed to, the first and second rectangular plates.

Together, the rectangular plates and reinforcement bars form a reinforcing exoskeleton-type structure around the periphery of the box-like frame, effectively preventing torsional deformation of the frame. In order to further minimize deformation of the filter assembly during clamping in a filter housing, the reinforcement bars may advantageously be arranged in the area of the support frame where load is to be applied when the filter is clamped in a filter housing.

In some prior art high temperature filters there have been problems caused by residual particulates from the materials used to seal the filter core to the frame. According to some embodiments, the inner edges of the first and/or second unitary rectangular plate at least cover any compressible heat resistant fibrous material and solid inorganic sealant composition arranged between the filter core and the frame.

According to some embodiments, the inner edges of the first and/or second unitary rectangular plate are flanged towards the upstream side or downstream side of the filter assembly respectively, such that a continuous channel is formed between said flanged inner edges and the periphery of the upstream side or downstream side of the filter assembly.

The inventive high efficiency air filter assembly comprises several components, such as filter media, pleat separators, inorganic sealant, heat resistant fibrous material, flexible liner and frame. Preferably, all of the components of the inventive high efficiency air filter assembly are selected to be suitable for high temperature applications, wherein the filter assembly is repeatedly or continuously heated to a temperature in the range of 200-500° C., particularly when the filter assembly is subjected to repeated cycling between low temperature (for example about 25° C.) and high temperature (for example in the range of 200-500° C.).

In order to achieve an efficient seal between the filter media and the inorganic sealant, the zig-zag ends of the filter media are immersed in an inorganic sealant composition in liquid state and then allowing the inorganic sealant to harden to a solid state. The inorganic sealant composition in liquid state should preferably be of sufficiently low viscosity to efficiently wet and form around the immersed zig-zag end of the filter media so that an air tight seal is formed.

According to other aspects illustrated herein, there is provided a method for manufacturing a high efficiency air filter assembly for high temperature applications comprising:

(a) providing a filter core including a unitary sheet of air-permeable filter media folded in accordion fashion to form a plurality of side-by-side pleats with zig-zag edges on two opposite sides and flat panels on the other two sides, and a spacer member between opposing walls of successive pleats;

(b) providing a first rectangular end casing having a recess configured to receive a zig-zag side of the filter core;

(c) substantially filling said recess of said first end casing with a inorganic sealant composition in a liquid state, hardenable to a solid state;

(d) inserting said filter core into the recess of said first end casing such that a first zig-zag edge of the filter core is fully immersed in said inorganic sealant;

wherein the unitary sheet of air-permeable filter media preferably consists of a binder-free glass or mineral fiber filter media.

According to other aspects illustrated herein, there is provided a method for manufacturing a high efficiency air filter assembly for high temperature applications comprising:

(a) providing a filter core including a unitary sheet of air-permeable filter media folded in accordion fashion to form a plurality of side-by-side pleats with zig-zag edges on two opposite sides and flat panels on the other two sides, and a spacer member between opposing walls of successive pleats;

(b) providing a first rectangular end casing having a recess configured to receive a zig-zag side of the filter core;

(c) providing a flexible liner in the recess of the first end casing;

(d) providing a compressible heat resistant fibrous material in the recess of the first end casing;

(e) substantially filling said recess of said first end casing with a inorganic sealant composition in a liquid state, hardenable to a solid state, whereby the flexible liner prevents direct contact between the liquid inorganic sealant composition and the frame;

(f) inserting said filter core into the recess of said first end casing such that a first zig-zag edge of the filter core is fully immersed in said inorganic sealant;

(g) allowing the inorganic sealant in said first end casing to harden to a substantially solid state;

wherein the unitary sheet of air-permeable filter media preferably consists of a binder-free glass or mineral fiber filter media.

According to other aspects illustrated herein, there is provided a method for manufacturing a high efficiency air filter assembly for high temperature applications comprising:

(a) providing a filter core including a unitary sheet of air-permeable filter media folded in accordion fashion to form a plurality of side-by-side pleats with zig-zag edges on two opposite sides and flat panels on the other two sides, and a spacer member between opposing walls of successive pleats;

(b) providing a pair of substantially identical, rectangular side casings having a recess configured to receive a flat panel side of the filter core and having a lip of lesser width than said side casings extending outwardly from each end thereof;

(c) providing a pair of substantially identical, rectangular end casings having a width equal to the width of said side casings and having a recess configured to receive a zig-zag side of the filter core;

(d) providing a compressible heat resistant fibrous material in the recesses of the side casings;

(e) arranging the side casings on the flat panel sides of the filter core such that an air tight engagement is formed between the side casing and the flat panel side of the filter core by the a compressible heat resistant fibrous material;

(f) providing a flexible liner in the recess of the first end casing and on a first pair of lips of the side casings;

(g) providing a compressible heat resistant fibrous material n the recess of the first end casing;

(h) substantially filling said recess of said first end casing with a inorganic sealant composition in a liquid state, hardenable to a solid state, whereby the flexible liner prevents direct contact between the liquid inorganic sealant composition and the frame;

(i) inserting said filter core and first pair of lips of the side casings into the recess of said first end casing such that a first zig-zag edge of the filter core is fully immersed in said inorganic sealant;

(j) allowing the inorganic sealant in said first end casing to harden to a substantially solid state;

(k) providing a flexible liner in the recess of the second end casing and on the second pair of lips of the side casings;

(l) providing a compressible heat resistant fibrous material in the recess of the second end casing;

(m) substantially filling said recess of said second end casing with the liquid inorganic sealant composition, whereby the flexible liner prevents direct contact between the liquid inorganic sealant composition and the frame;

(n) inserting said filter core and second pair of lips of the side casings into the recess of said second end casing such that the second zig-zag edge of the filter core is fully immersed in said inorganic sealant;

(o) allowing the inorganic sealant in said first and second end casing to harden to a solid state;

wherein the unitary sheet of air-permeable filter media preferably consists of a binder-free glass or mineral fiber filter media.

According to some embodiments of the manufacturing method, the binder-free glass or mineral fiber filter media is a glass fiber filter media made of binder-free borosilicate glass fiber.

According to other aspects illustrated herein, there is provided the use of a high efficiency air filter assembly as described herein, or manufactured according to the manufacturing methods described herein, in a high temperature application, wherein the filter assembly is repeatedly or continuously heated to a temperature in the range of 200-500° C., particularly wherein the filter assembly is subjected to repeated cycling between low temperature (for example about 25° C.) and high temperature (for example in the range of 200-500° C.).

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF PREFERRED EMBODIMENTS

Figure 1A:
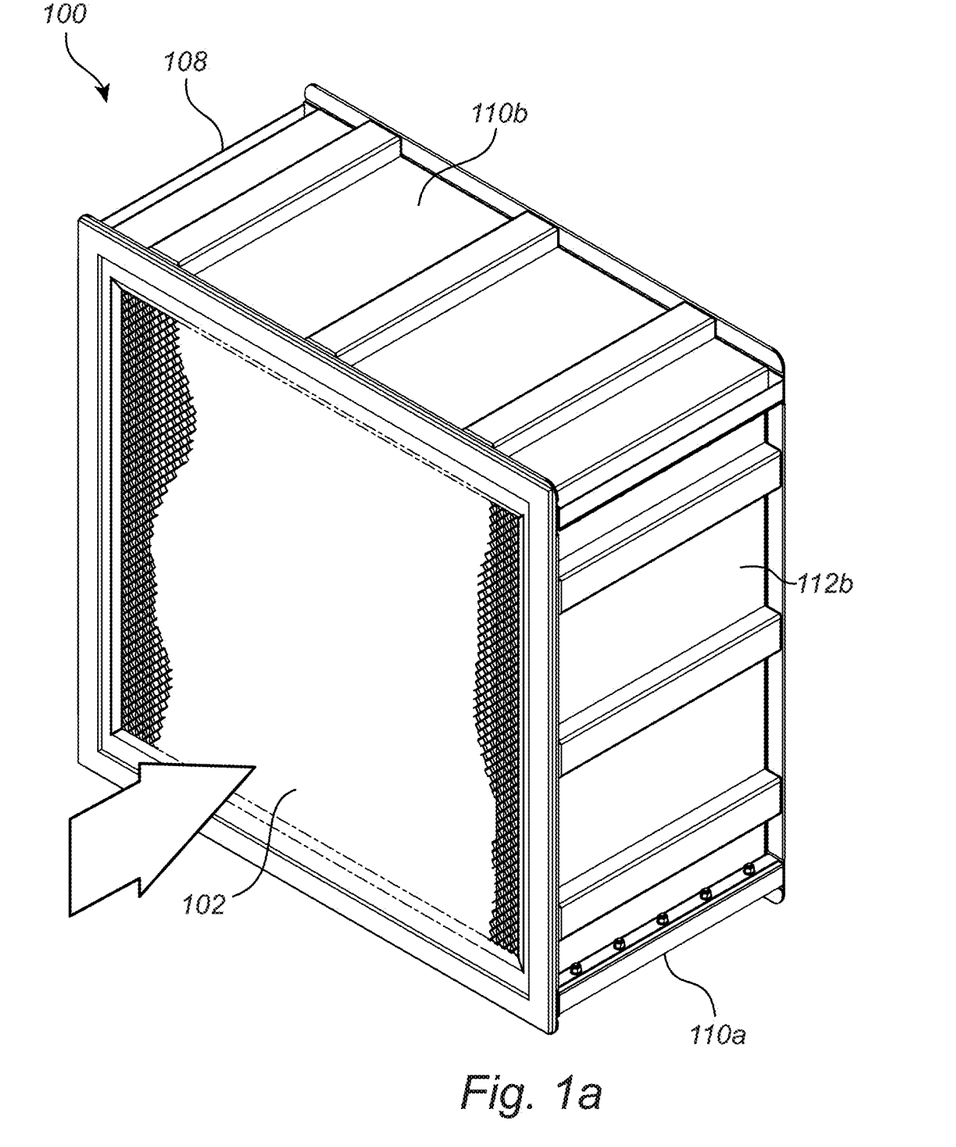
FIG. 1a is a perspective view of an embodiment of the inventive filter.
Figure 1B:
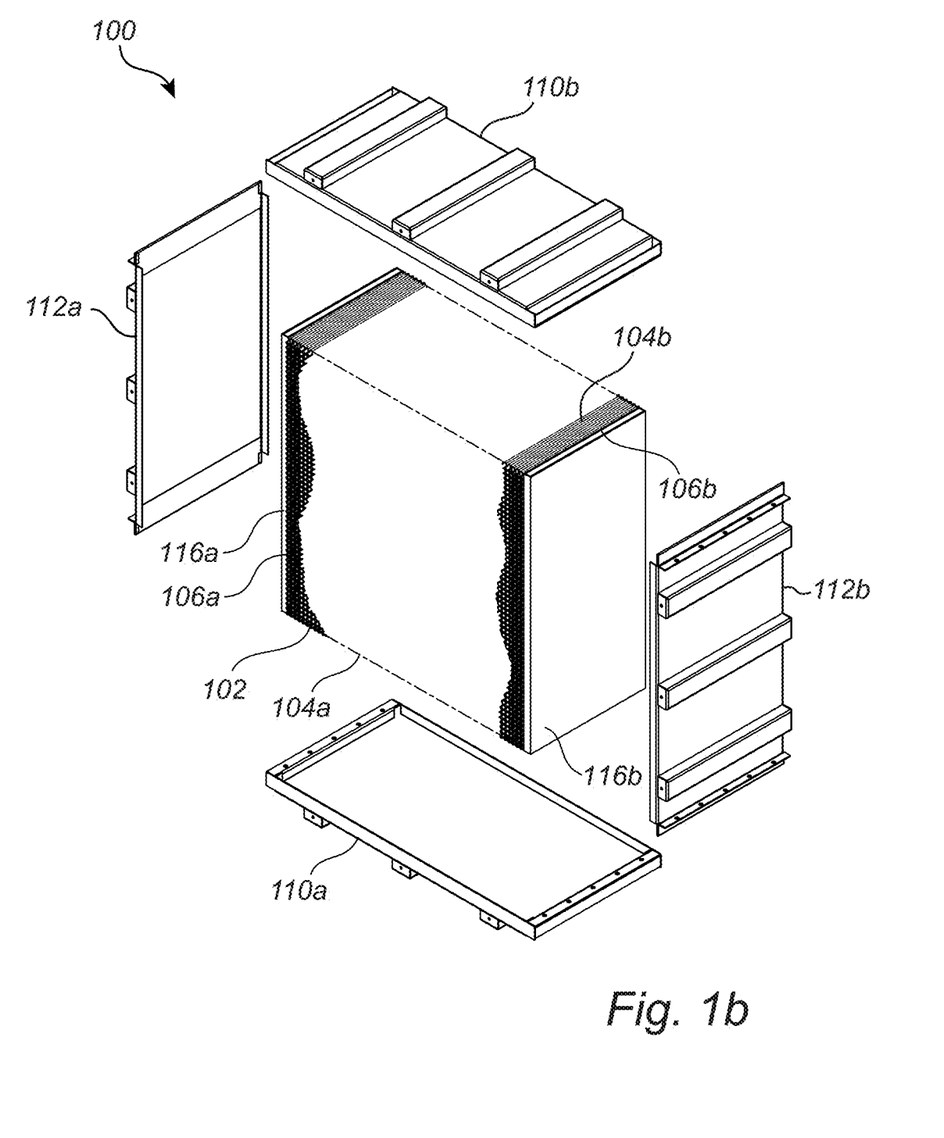
FIG. 1b is an exploded perspective view of an embodiment of the inventive filter.

As shown in FIGS. 1a and 1b, the filter assembly 100 of the present invention includes a filter core 102 comprising a unitary sheet of air-permeable filter media folded in accordion fashion to form a plurality of side-by-side pleats with zig-zag edges on two opposite sides (zig-zag edge sides 104a, 104b) and flat panels on the other two sides (flat panel sides 106a, 106b), and a spacer member between opposing walls of successive pleats, in both the upstream and downstream directions of air flow. Filter cores of this type are well known in the art and are explained, e.g., in U.S. Pat. No. 2,884,091 of Baldwin. In FIG. 1a, the filter core is shown with mats of compressible heat resistant fibrous material 116a, 116b arranged on the flat panel sides 106a, 106b of the filter core. The mats 116a, 116b may advantageously be folded into or enveloped in the final pleats of the air-permeable filter media, such that the heat resistant fibrous material is not directly exposed to the downstream side of the filter assembly. This arrangement prevents any particulate residues from the heat resistant fibrous material from reaching the downstream side of the filter assembly.

The filter core is supported in and sealed to a surrounding box-like metal frame 108 enclosing said filter core 102 on four sides in air tight engagement to define an air flow opening extending between upstream and downstream sides of the assembly. As shown in FIG. 1b, the box-like metal frame 108 is formed of two opposing end casing members (end casings 110a, 110b) and two opposing side casing members (side casings 112a, 112b) maintained in assembled relation with one another.

The sheet of filter media used in the filters of the present disclosure consists of a binder-free glass or mineral fiber filter media.

The glass or mineral fiber filter media used in the present invention is binder-free. This means that the media is substantially free of any binders strengthening agents or additives commonly used for binding the fibers of the media together. The media used in the present invention are preferably made of 100% glass or mineral fiber and free of binders.

Binder-free glass or mineral fiber filter media retain their structural rigidity and high filtering efficiency even when exposed to high temperatures for relatively long time periods.

According to some embodiments, the high efficiency air filter assembly of the present invention is HEPA class H13 or higher according to European Norm EN 1822:2009. The air filter assembly is also preferably capable of maintaining a HEPA class of H13 or higher according to European Norm EN 1822:2009, over an extended period of use at temperatures in the range 200-500° C., and particularly wherein the filter assembly is subjected to repeated cycling between low temperature (for example about 25° C.) and high temperature (for example in the range of 200-500° C.).

In a preferred embodiment, the binder-free glass or mineral fiber filter media is a glass fiber filter media made of binder-free borosilicate glass fiber.

The spacer members are preferably made of stainless steel. The spacer members may for example be provided in the form of thin corrugated or pleated sheets or foils of stainless steel. The spacer members keep the pleats separated and help distribute the air flow evenly over the filter media surface with a minimal blockage of the filter media. The design of such spacer members is well known in the art.

Figure 2:
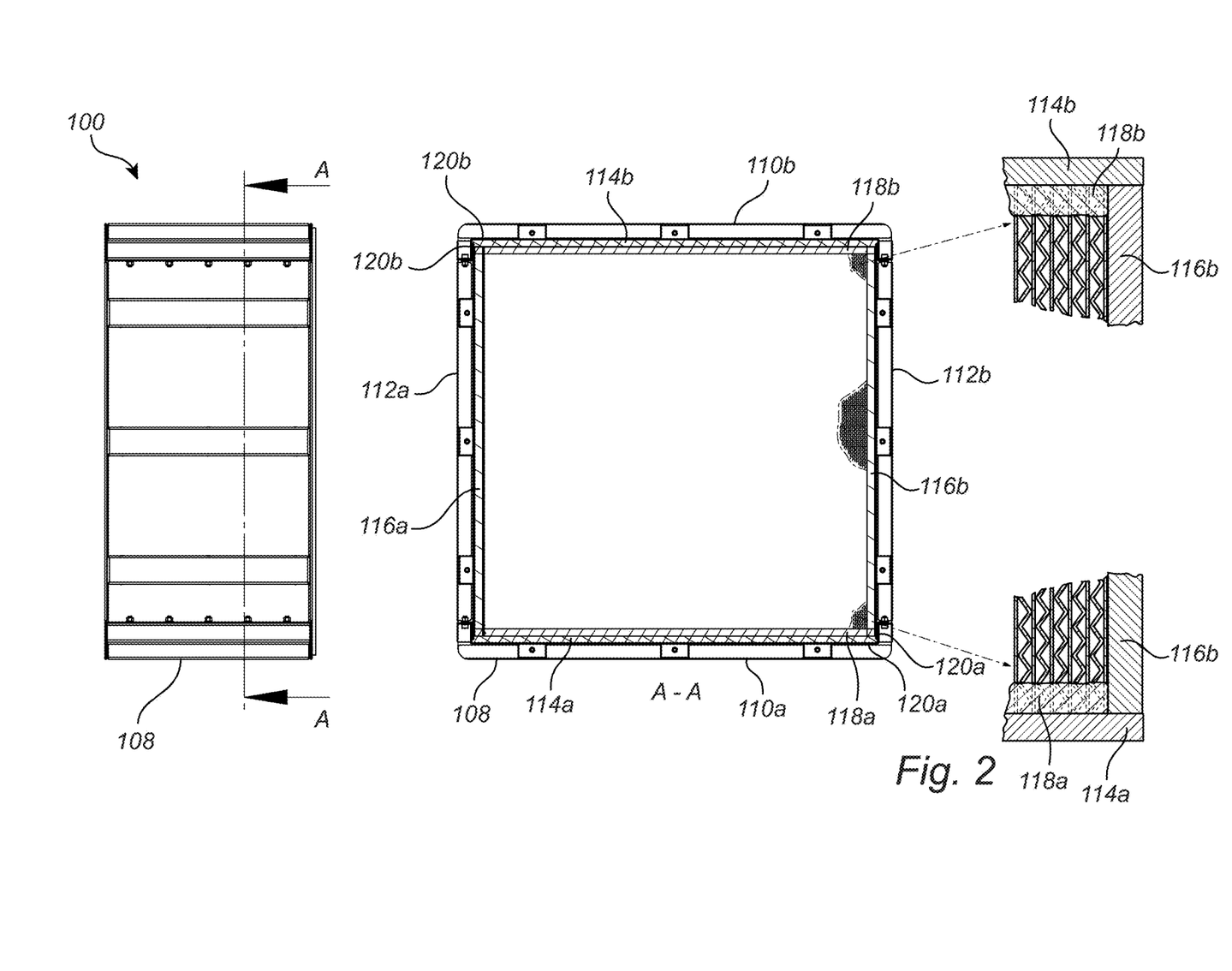
FIG. 2 is a cross-sectional view of an embodiment of the inventive filter.

The filter core 102 is mounted within the frame 108 in such manner as to positively prevent bypassing or leakage of particles, around the filter core. The sealing arrangement is illustrated in FIG. 2, showing a vertical cross section of the filter assembly 100.

In order to form an effective mounting of the filter core 102, which will seal the filter core within the frame 108 and prevent bypassing of unfiltered air, and which may withstand high temperature gases, a compressible mat of a heat resistant fibrous material is arranged between the filter core and the frame. The compressible heat resistant fibrous material 114a, 114b, 116a, 116b is arranged between the zig-zag edge sides 104a, 104b of the filter core and the end casings 110a, 110b of the frame, and between the flat panel sides 106a, 106b of the filter core and the side casings 112a, 112b of the frame (see FIG. 2). Typically the shape of the compressible mat of heat resistant fibrous material 114a, 114b, 116a, 116b will correspond to the shape of the filter core side, and the size of the mat of heat resistant fibrous material will correspond to or somewhat exceed the size of the filter core side.

The compressible heat resistant fibrous material is composed of extremely fine mineral fibers, and is dense enough, also at high temperatures with associated thermal expansion of the metal frame, to prevent air and associated particulate contaminants to pass. The compressible heat resistant fibrous material when arranged in the filter assembly is compressed in thickness to at least about half of its original thickness, preferably to about one fourth of its original thickness. Because the heat resistant fibrous material is compressed, it is capable of expanding when the metal frame expands, thereby providing a flexible resilient seal between the filter core and the frame. As an example, a suitable material having a density in the uncompressed state of about 90-100 kg/m3 and a thickness of about 10-50 mm may be compressed to at least about half of its original thickness.

The heat resistant fibrous material may substantially consist of glass or aluminum oxide fibers or a combination thereof. Preferably the heat resistant fibrous material may substantially consist of aluminum oxide fibers. Aluminum oxide fibers are preferred to glass fibers in the heat resistant fibrous material, since aluminum oxide fibers better retain their flexibility over extended periods of use at high temperatures. Alumina fibers are high-purity polycrystalline fibers designed for use in applications up to 1600° C. Alumina fibers can be produced with high levels of chemical purity and low levels of shot content (non-fibrous particles). The fiber diameter can be strictly controlled with a median of approximately 3 microns with very low levels of fiber less than 1 micron in diameter.

The flat panel sides 106a, 106b of the filter core 102 are maintained in a substantially air tight arrangement with the side casings 112a, 112b of the frame through the heat resistant fibrous material 116a, 116b disposed between flat panel sides of the filter core and the frame. Because of the large surface area of the flat panel sides in contact with the inside of the side casings via the heat resistant fibrous material, further sealing at the side casings is generally not required in order to provide a leak proof seal, even for a very high efficiency filter. The zig-zag edge sides 104a, 104b of the filter core, on the other hand, provide a much smaller surface area of in contact with the inside of the end casings 110a, 110b, requiring further measures for providing a leak proof seal suitable for a high efficiency filter.

For this reason, the zig-zag edges 104a, 104b of the binder-free glass or mineral fiber filter media are sealingly embedded in an inorganic sealant compositions comprised of a solid geopolymer composition 118 in the end casings of the frame. In turn, the solid geopolymer composition is maintained in a substantially air tight arrangement with the end casings 110a, 110b of the frame through the compressible mat of heat resistant fibrous material 114a, 114b disposed between the filter core and the frame.

As used herein, the term geopolymer refers generally to a synthetic inorganic polymer. The geopolymer is essentially a mineral chemical compound or mixture of compounds consisting of repeating units, created through a process of geopolymerization. Geopolymer compositions can be provided in a liquid state, hardenable to a solid state. In the hardened state, the geopolymer is highly temperature resistant. Geopolymers comprise one or more of the following repeating units (or chemical groups), linked with covalent bonds:

—Si—O—Si—O— siloxo, poly(siloxo)
—Si—O—Al—O— sialate, poly(sialate)
—Si—O—Al—O—Si—O— sialate-siloxo, poly(sialate-siloxo)
—Si—O—Al—O—Si—O—Si—O— sialate-disiloxo, poly(sialate-disiloxo)
—P—O—P—O— phosphate, poly(phosphate)
—P—O—Si—O—P—O— phospho-siloxo, poly(phospho-siloxo)
—P—O—Si—O—Al—O—P—O— phospho-sialate, poly(phospho-sialate)
—(R)—Si—O—Si—O—(R) organo-siloxo, poly-silicone
—Al—O—P—O— alumino-phospho, poly(aluminophospho)
—Fe—O—Si—O—Al—O—Si—O— ferro-sialate, poly(ferro-sialate).

Examples of suitable geopolymers for use in the filters of the present disclosure include those described in PCT/FR2011/000185.

Figure 3:
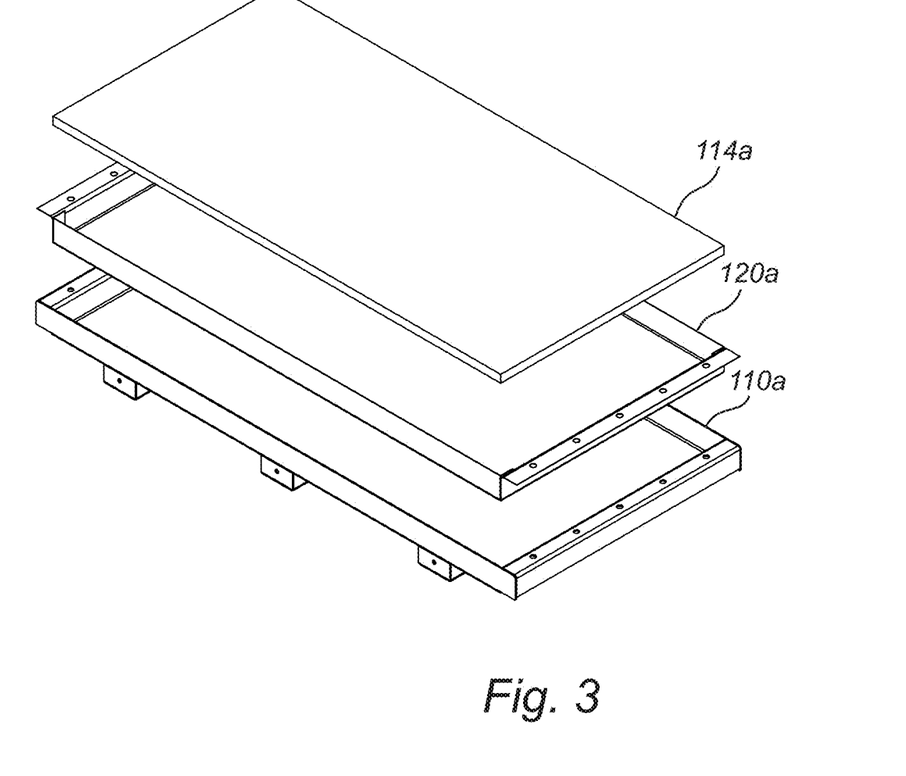
FIG. 3 is a perspective view of an embodiment of an end casing.

The zig-zag edge side of the filter core is embedded in the solid geopolymer composition. This can be achieved by substantially filling a recess of an end casing 110a, 110b with a geopolymer composition in a liquid state, hardenable to a solid state, inserting the filter core into the recess of the end casing such that a zig-zag edge of the filter core is fully immersed in the geopolymer, and then allowing the geopolymer to harden to a solid state. This method allows for use of a relatively low viscosity inorganic sealant which permits control over the immersion depth of the zig-zag edge to provide an even sealing without undue blockage of the filter media. As shown in FIG. 3, to avoid direct contact between the geopolymer 118a, 118b and the frame 108, and to provide a resilient or flexible intermediate layer between the metal and the geopolymer, a thin layer of a flexible material, or liner 120a, 120b, may be placed between the geopolymer and the metal frame. Accordingly, the geopolymer composition is separated from the frame by a flexible liner arranged at an inner surface of the frame, said flexible liner preventing direct contact between the geopolymer composition and the frame, and providing a resilient contact between the geopolymer composition and the frame, such that the frame can expand on heating without subjecting the hardened geopolymer composition to mechanical stress. The flexible liner 120a, 120b may be comprised of a sheet of HEPA filter media. As an example, a low resistance borosilicate microfiber HEPA filter medium having a thickness around 0.5 mm may be used.

In the filter assembly, as described herein with reference to the Figures, the zig-zag edge sides of the filter core 102 are embedded and fixed in the solid geopolymer composition 118 such that the filter core and solid geopolymer composition form a unit. This filter core and solid geopolymer composition unit is suspended in a resilient or flexible manner within the frame such that the filter core and solid geopolymer composition unit can move resiliently within the frame in a plane substantially orthogonal to the general air flow direction. The resilient suspension reduces or substantially eliminates detrimental mechanical stress on the geopolymer composition, the filter media, and on the joint between the geopolymer composition and the filter media, due to thermal expansion of the metal frame during at high temperatures.

The solid inorganic sealant composition preferably covers the heat resistant fibrous material such that the heat resistant fibrous material is sealed between the solid inorganic sealant composition and the frame. This means that the heat resistant fibrous material is not directly exposed to the downstream side of the filter assembly. This arrangement prevents any particulate residues from the heat resistant fibrous material from reaching the downstream side of the filter assembly.

Figure 4A:
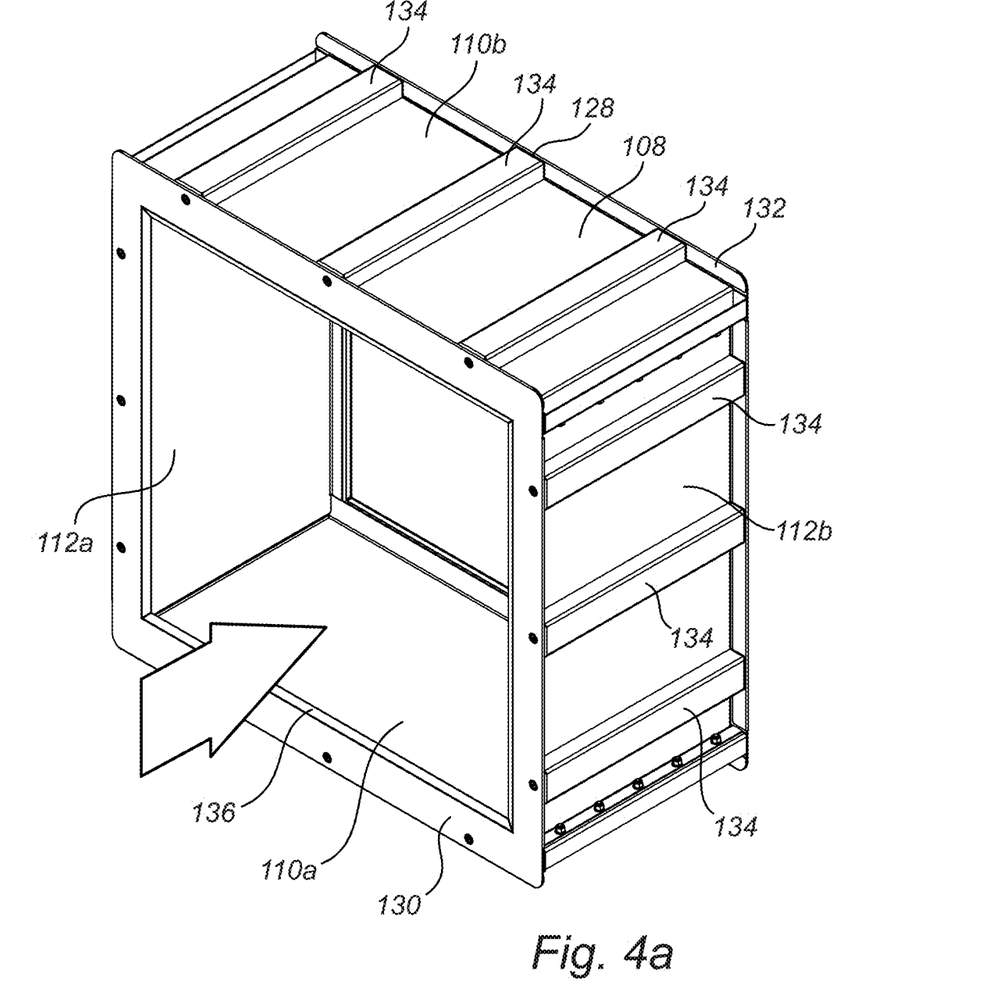
FIG. 4a is a perspective view of an embodiment of the frame.
Figure 4B:
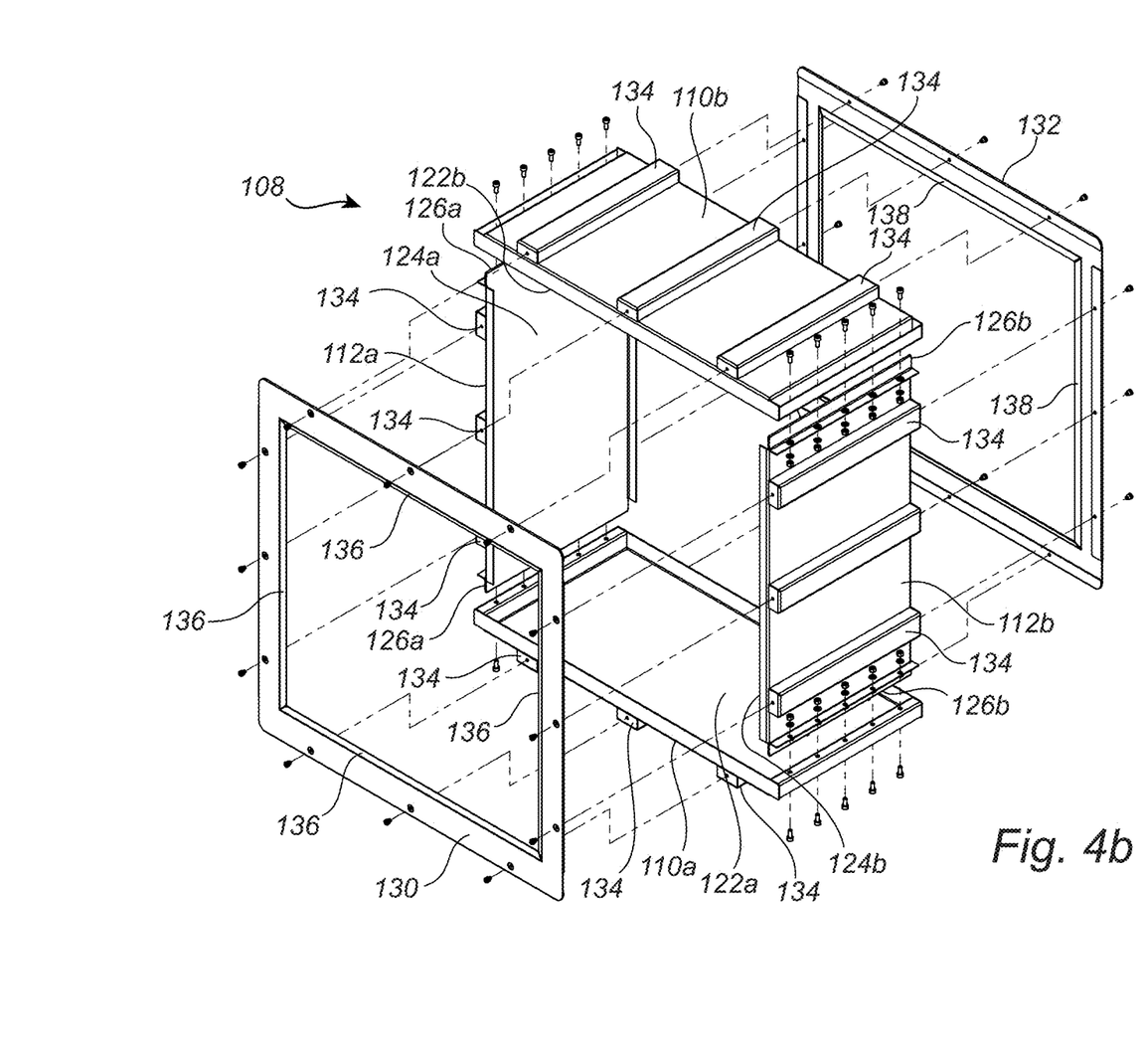
FIG. 4b is an exploded perspective view of an embodiment of the frame.

With reference to FIGS. 4a and 4b, the frame 108 of the air filter assembly 100 may comprise a pair of substantially identical, rectangular side casings 112a, 112b having a recess 124a, 124b configured to receive a flat panel side of the filter core and having a lip 126a, 126b of lesser width than said side casings extending outwardly from each end thereof, and a pair of substantially identical, rectangular end casings 110a, 110b having a width equal to the width of said side casings and having a recess 122a, 122b configured to receive a zig-zag side of the filter core. The recesses of the end casings are formed in the shape of a shallow pan with a depth typically in the range of 2-8 cm, preferably in the range of 2-5 cm, such that the recess can fully accommodate the compressible mat of heat resistant fibrous material as well as the solid geopolymer composition and the optional flexible liner.

As shown in FIG. 4b, the lips 126a, 126b of the side casings allows for the side casings to be connected to the end casings. In order to insure that the filter core and solid geopolymer composition can move resiliently in relation to the frame, the recesses of the box-like metal frame have substantially smooth inner surfaces. Accordingly, the length of the lips 126a, 126b of the side casings preferably substantially corresponds to the depth of the recesses 122a, 122b of the end casings. This configuration provides a substantially smooth inner surface at the point of contact between the sides casing of the frame and the geopolymer, which prevents snagging and possible cracking of the geopolymer due to thermal expansion of the metal frame at high temperatures.

Stainless steel is the preferred material for the frame, as well as the spacer elements. Thus, according to some embodiments, the box-like metal frame is formed of stainless steel. The side and end casings may preferably be formed of bent and welded sheet stainless steel. As illustrated in FIG. 4b, the end and side casings can be maintained in assembled relation with one another, e.g. by bolts or rivets.

As seen in FIGS. 1a, 1b, 4a and 4b, the lips can advantageously be formed as an integral part of a sheet steel side casing by folding an end portion of the sheet steel back and outwards so as to form the lip as well as a flange suitable for being attached to a corresponding flange on an end casing, e.g. by bolting or riveting. This allows for the end and side casings to be attached to one another while maintaining a smooth inner surface of the frame.

It has been found that the solid geopolymer composition may be damaged if the frame is subjected to deformation, e.g. torsional deformation during handling, transport or mounting. Box-like filters are typically mounted by clamping against a sealing frame of a filter housing, e.g. using a number of bolts or the like. Incorrect or uneven clamping could subject the filter frame to torsional forces, leading to torsional deformation and possible damage to the solid geopolymer composition. In order to reduce the risk of damage to the solid geopolymer composition, the frame of the air filter assembly can be provided with a reinforcement structure for preventing deformation.

In the embodiment as shown in FIGS. 4a and 4b, the reinforcement structure 128 comprises a first unitary rectangular plate 130 arranged around the periphery of the downstream side of the filter assembly 100 and fixed to all four sides 110a, 110b, 112a, 112b of the metal frame 108. The reinforcement structure further comprises a second unitary rectangular plate 132 arranged around the periphery of the upstream side of the filter assembly and fixed to all four sides of the metal frame. The rectangular plates may preferably be formed of stainless steel and will typically have a thickness in the range of 1-3 mm.

Optionally, the reinforcement structure further comprises reinforcement bars 134 arranged at different sides of the metal frame, each reinforcement bar extending between, and being rigidly fixed, e.g. bolted or welded, to the first and second rectangular plates 130, 132. The reinforcement bars 134 may preferably be provided in the form of square profile tubular or solid stainless steel. Together, the rectangular plates and reinforcement bars form a reinforcing exoskeleton-type structure 128 around the periphery of the box-like frame 108, effectively preventing torsional deformation of the frame. In order to further minimize deformation of the filter assembly during clamping in a filter housing, the reinforcement bars may advantageously be arranged in the area of the support frame where load is to be applied when the filter is clamped in a filter housing.

The inner edges 136, 138 of the first and/or second unitary rectangular plate 130, 132 arranged around the periphery of the upstream side or downstream side of the filter assembly 100 may at least cover any compressible heat resistant fibrous material and solid geopolymer composition arranged between the filter core and the frame.

The inner edges 136, 138 of the first and/or second unitary rectangular plate 130, 132 arranged around the periphery of the upstream side or downstream side of the filter assembly may be flanged towards the upstream side or downstream side of the filter assembly respectively, such that a continuous channel is formed between said flanged inner edges and the periphery of the upstream side or downstream side of the filter assembly.

A high efficiency air filter assembly as described above with reference to FIGS. 1-3 can be manufactured in the following main steps:

(a) providing a filter core including a unitary sheet of air-permeable filter media folded in accordion fashion to form a plurality of side-by-side pleats with zig-zag edges on two opposite sides and flat panels on the other two sides, and a spacer member between opposing walls of successive pleats, wherein the unitary sheet of air-permeable filter media consists of a binder-free glass or mineral fiber filter media;

(b) providing a pair of substantially identical, rectangular side casings having a recess configured to receive a flat panel side of the filter core and having a lip of lesser width than said side casings extending outwardly from each end thereof;

(c) providing a pair of substantially identical, rectangular end casings having a width equal to the width of said side casings and having a recess configured to receive a zig-zag side of the filter core;

(d) providing a compressible heat resistant fibrous material in the recesses of the side casings;

(e) arranging the side casings on the flat panel sides of the filter core such that an air tight engagement is formed between the side casing and the flat panel side of the filter core by the a compressible heat resistant fibrous material;

(f) providing a flexible liner in the recess of the first end casing and on a first pair of lips of the side casings;

(g) providing a compressible heat resistant fibrous material in the recess of the first end casing;

(h) substantially filling said recess of said first end casing with a geopolymer composition in a liquid state, hardenable to a solid state, whereby the flexible liner prevents direct contact between the liquid geopolymer composition and the frame;

(i) inserting said filter core and first pair of lips of the side casings into the recess of said first end casing such that a first zig-zag edge of the filter core is fully immersed in said geopolymer;

(j) allowing the geopolymer in said first end casing to harden to a substantially solid state;

(k) providing a flexible liner in the recess of the second end casing and on the second pair of lips of the side casings;

(l) providing a compressible heat resistant fibrous material in the recess of the second end casing;

(m) substantially filling said recess of said second end casing with the liquid geopolymer composition, whereby the flexible liner prevents direct contact between the liquid geopolymer composition and the frame;

(n) inserting said filter core and second pair of lips of the side casings into the recess of said second end casing such that the second zig-zag edge of the filter core is fully immersed in said geopolymer;

(o) allowing the geopolymer in said first and second end casing to harden to a solid state.

As described herein, the inventive high efficiency air filter assembly comprises several components, such as filter media, pleat separators, geopolymer, heat resistant fibrous material, flexible liner and frame. Preferably, all of the components of the inventive high efficiency air filter assembly are selected to be suitable for high temperature applications, wherein the filter assembly is repeatedly or continuously heated to a temperature in the range of 200-500° C.

The high efficiency air filter assembly retains its structural rigidity and high filtering efficiency when exposed to high temperatures for relatively long time periods, and particularly when subjected to repeated cycling between low temperature (for example about 25° C.) and high temperature (for example in the range of 200-500° C.). The high efficiency air filter assembly of the present invention is preferably HEPA class H13 or higher according to European Norm EN 1822:2009. The air filter assembly is also preferably capable of maintaining a HEPA class of H13 or higher according to European Norm EN 1822:2009, over an extended period of use at temperatures in the range 200-500° C.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein for carrying out this invention, but that the invention will include all embodiments falling within the scope of the appended claims.

LIST OF EMBODIMENTS

Embodiment 1

High efficiency air filter assembly (100) for high temperature applications comprising: a filter core (102) including a unitary sheet of air-permeable media folded in accordion fashion to form a plurality of side-by-side pleats with zig-zag edges on two opposite sides and flat panels on the other two sides, and a spacer member between opposing walls of successive pleats, a box-like metal frame (108) enclosing said filter core on four sides in air tight engagement to define an air flow opening extending between upstream and downstream sides of said assembly, wherein the zig-zag edges of the unitary sheet of air-permeable filter media are sealingly embedded in a solid inorganic sealant composition (118) in the frame.

Embodiment 2

High efficiency air filter assembly according to embodiment 1, wherein the unitary sheet of air-permeable filter media consists of a binder-free glass or mineral fiber filter media.

Embodiment 3

High efficiency air filter assembly according to embodiment 2, wherein the binder-free glass or mineral fiber filter media is a glass fiber filter media made of binder-free borosilicate glass fiber.

Embodiment 4

High efficiency air filter assembly according to any one of the preceding embodiments, wherein the spacer members are made of stainless steel.

Embodiment 5

High efficiency air filter assembly according to any one of the preceding embodiments, wherein the inorganic sealant composition is a geopolymer composition which can be provided in a liquid state, hardenable to a solid state.

Embodiment 6

High efficiency air filter assembly according to any one of the preceding embodiments, wherein the filter core and solid inorganic sealant composition are resiliently suspended within the frame.

Embodiment 7

High efficiency air filter assembly according to any one of the preceding embodiments, wherein the filter core and solid inorganic sealant composition can move resiliently in relation to the frame.

Embodiment 8

High efficiency air filter assembly according to embodiment 7, wherein the resilient suspension between said filter core and solid inorganic sealant composition is provided by a compressible heat resistant fibrous material arranged between the solid inorganic sealant composition and the frame and between the flat panel sides of the filter core and the frame.

Embodiment 9

High efficiency air filter assembly according to embodiment 8, wherein the heat resistant fibrous material substantially consists of glass or aluminum oxide fibers or a combination thereof, preferably the heat resistant fibrous material substantially consists of aluminum oxide fibers.

Embodiment 10

High efficiency air filter assembly according to embodiment 8 or 9, wherein the heat resistant fibrous material arranged between the solid inorganic sealant composition and the frame is sealed between the solid inorganic sealant composition and the frame, such that the heat resistant fibrous material is not directly exposed to the downstream side of the filter assembly.

Embodiment 11

High efficiency air filter assembly according to any one of embodiments 8-10, wherein the heat resistant fibrous material arranged between the flat panel sides of the filter core and the frame are enveloped by the unitary sheet of air-permeable filter media, such that the heat resistant fibrous material is not directly exposed to the downstream side of the filter assembly.

Embodiment 12

High efficiency air filter assembly according to any one of the preceding embodiments, wherein the inorganic sealant composition is separated from the frame by a flexible liner.

Embodiment 13

High efficiency air filter assembly according to any one of the preceding embodiments, wherein the filter assembly comprises a flexible liner arranged at an inner surface of the frame, said flexible liner preventing direct contact between the inorganic sealant composition and the frame and providing a resilient contact between the inorganic sealant composition and the frame such that the support frame can expand on heating without subjecting the inorganic sealant to mechanical stress.

Embodiment 14

High efficiency air filter assembly according to any one of embodiments 12-13, wherein the flexible liner is comprised of a sheet of HEPA filter media.

Embodiment 15

High efficiency air filter assembly according to any one of the preceding embodiments, wherein the air filter assembly is HEPA class H13 or higher according to European Norm EN 1822:2009.

Embodiment 16

High efficiency air filter assembly according to embodiment 15, wherein the air filter assembly is capable of maintaining a HEPA class of H13 or higher according to European Norm EN 1822:2009, over an extended period of use at temperatures in the range 200-500° C.

Embodiment 17

High efficiency air filter assembly according to any one of the preceding embodiments, wherein the box-like metal frame comprises: a pair of substantially identical, rectangular side casings having a recess configured to receive a flat panel side of the filter core and having a lip of lesser width than said side casings extending outwardly from each end thereof, and a pair of substantially identical, rectangular end casings having a width equal to the width of said side casings and having a recess configured to receive a zig-zag side of the filter core.

Embodiment 18

High efficiency air filter assembly according to any one of the preceding embodiments, wherein the recesses of the box-like metal frame have substantially smooth inner surfaces.

Embodiment 19

High efficiency air filter assembly according to any one of the preceding embodiments, wherein the length of the lips of the side casings substantially corresponds to the depth of the recesses of the end casings.

Embodiment 20

High efficiency air filter assembly according to any one of the preceding embodiments, wherein the box-like metal frame is formed of stainless steel.

Embodiment 21

High efficiency air filter assembly according to any one of the preceding embodiments, wherein the box-like metal frame comprises a reinforcement structure, said reinforcement structure comprising a first unitary rectangular plate arranged around the periphery of the upstream side of the filter assembly and fixed to all four sides of the metal frame such that torsional deformation of the metal frame is prevented.

Embodiment 22

High efficiency air filter assembly according to any one of the preceding embodiments, wherein the box-like metal frame comprises a reinforcement structure, said reinforcement structure comprising a second unitary rectangular plate arranged around the periphery of the downstream side of the filter assembly and fixed to all four sides of the metal frame such that torsional deformation of the metal frame is prevented.

Embodiment 23

High efficiency air filter assembly according to embodiments 21 and 22, wherein the box-like metal frame comprises a reinforcement structure, said reinforcement structure further comprising at least two reinforcement bars arranged at different sides of the metal frame, each reinforcement bar extending between, and being rigidly fixed to, the first and second rectangular plates.

Embodiment 24

High efficiency air filter assembly according to embodiment 23, wherein the reinforcement bars are arranged in the area of the support frame where load is to be applied when the filter is clamped in a filter housing.

Embodiment 25

High efficiency air filter assembly according to any one of embodiments 21-24, wherein the inner edges of the first and/or second unitary rectangular plate at least cover any compressible heat resistant fibrous material and solid inorganic sealant composition arranged between the filter core and the frame.

Embodiment 26

High efficiency air filter assembly according to embodiment 25, wherein the inner edges of the first and/or second unitary rectangular plate are flanged towards the upstream side or downstream side of the filter assembly respectively, such that a continuous channel is formed between said flanged inner edges and the periphery of the upstream side or downstream side of the filter assembly.

Embodiment 27

A method for manufacturing a high efficiency air filter assembly for high temperature applications comprising: (a) providing a filter core including a unitary sheet of air-permeable filter media folded in accordion fashion to form a plurality of side-by-side pleats with zig-zag edges on two opposite sides and flat panels on the other two sides, and a spacer member between opposing walls of successive pleats; (b) providing a first rectangular end casing having a recess configured to receive a zig-zag side of the filter core; (c) substantially filling said recess of said first end casing with an inorganic sealant composition in a liquid state, hardenable to a solid state; (d) inserting said filter core into the recess of said first end casing such that a first zig-zag edge of the filter core is fully immersed in said inorganic sealant; wherein the unitary sheet of air-permeable media consists of a binder-free glass or mineral fiber filter media.

Embodiment 28

A method for manufacturing a high efficiency air filter assembly for high temperature applications comprising: (a) providing a filter core including a unitary sheet of air-permeable media folded in accordion fashion to form a plurality of side-by-side pleats with zig-zag edges on two opposite sides and flat panels on the other two sides, and a spacer member between opposing walls of successive pleats; (b) providing a first rectangular end casing having a recess configured to receive a zig-zag side of the filter core; (c) providing a flexible liner in the recess of the first end casing; (d) providing a compressible heat resistant fibrous material in the recess of the first end casing; (e) substantially filling said recess of said first end casing with an inorganic sealant composition in a liquid state, hardenable to a solid state, whereby the flexible liner prevents direct contact between the liquid inorganic sealant composition and the frame; (f) inserting said filter core into the recess of said first end casing such that a first zig-zag edge of the filter core is fully immersed in said inorganic sealant; (g) allowing the inorganic sealant in said first end casing to harden to a substantially solid state; wherein the unitary sheet of air-permeable media consists of a binder-free glass or mineral fiber filter media.

Embodiment 29

A method for manufacturing a high efficiency air filter assembly for high temperature applications comprising: (a) providing a filter core including a unitary sheet of air-permeable media folded in accordion fashion to form a plurality of side-by-side pleats with zig-zag edges on two opposite sides and flat panels on the other two sides, and a spacer member between opposing walls of successive pleats; (b) providing a pair of substantially identical, rectangular side casings having a recess configured to receive a flat panel side of the filter core and having a lip of lesser width than said side casings extending outwardly from each end thereof; (c) providing a pair of substantially identical, rectangular end casings having a width equal to the width of said side casings and having a recess configured to receive a zig-zag side of the filter core; (d) providing a compressible heat resistant fibrous material in the recesses of the side casings; (e) arranging the side casings on the flat panel sides of the filter core such that an air tight engagement is formed between the side casing and the flat panel side of the filter core by the compressible heat resistant fibrous material; (f) providing a flexible liner in the recess of the first end casing and on a first pair of lips of the side casings; (g) providing a compressible heat resistant fibrous material in the recess of the first end casing; (h) substantially filling said recess of said first end casing with an inorganic sealant composition in a liquid state, hardenable to a solid state, whereby the flexible liner prevents direct contact between the liquid inorganic sealant composition and the frame; (i) inserting said filter core and first pair of lips of the side casings into the recess of said first end casing such that a first zig-zag edge of the filter core is fully immersed in said inorganic sealant; (j) allowing the inorganic sealant in said first end casing to harden to a substantially solid state; (k) providing a flexible liner in the recess of the second end casing and on the second pair of lips of the side casings; (l) providing a compressible heat resistant fibrous material in the recess of the second end casing; (m) substantially filling said recess of said second end casing with the liquid inorganic sealant composition, whereby the flexible liner prevents direct contact between the liquid inorganic sealant composition and the frame; (n) inserting said filter core and second pair of lips of the side casings into the recess of said second end casing such that the second zig-zag edge of the filter core is fully immersed in said inorganic sealant; (o) allowing the inorganic sealant in said first and second end casing to harden to a solid state; wherein the unitary sheet of air-permeable media consists of a binder-free glass or mineral fiber filter media.

Embodiment 30

A method according to any one of embodiments 27-29, wherein the binder-free glass or mineral fiber filter media is a glass fiber filter media made of binder-free borosilicate glass fiber.

Embodiment 31

Use of a high efficiency air filter assembly according to any one of embodiments 1-26 in a high temperature application, wherein the filter assembly is repeatedly or continuously heated to a temperature in the range of 200-500° C.

The invention claimed is:

1. High efficiency air filter assembly for high temperature applications comprising:
    a filter core including a unitary sheet of air-permeable media folded in accordion fashion to form a plurality of side-by-side pleats with zig-zag edges on two opposite sides and flat panels on the other two sides, and a spacer member between opposing walls of successive pleats,
    a box-like metal frame enclosing said filter core on four sides in air tight engagement to define an air flow opening extending between upstream and downstream sides of said assembly,
    wherein the zig-zag edges of the unitary sheet of air-permeable filter media are sealingly embedded in a solid inorganic sealant composition in the frame;

a compressible heat resistant fibrous material arranged between the solid inorganic sealant composition and the frame and between the flat panel sides and the frame, providing a resilient suspension between said filter core and solid inorganic sealant composition; and a flexible liner arranged between the solid inorganic sealant composition and the frame, said flexible liner preventing direct contact between the inorganic sealant composition and the frame and providing a resilient contact between the inorganic sealant composition and the frame such that the support frame can expand on heating without subjecting the inorganic sealant composition to mechanical stress.

2. High efficiency air filter assembly according to claim 1, wherein the unitary sheet of air-permeable filter media comprises a binder-free glass fiber filter media or a binder-free mineral fiber filter media and the binder-free glass or mineral fiber filter media is a glass fiber filter media made of binder-free borosilicate glass fiber.

3. High efficiency air filter assembly according to claim 1, wherein the spacer members are made of stainless steel.

4. High efficiency air filter assembly according to claim 1, wherein the inorganic sealant composition is a geopolymer composition which can be provided in a liquid state, hardenable to a solid state.

5. High efficiency air filter assembly according to claim 1, wherein the heat resistant fibrous material consists of glass or aluminum oxide fibers or a combination thereof.

6. High efficiency air filter assembly according to claim 1, wherein the heat resistant fibrous material arranged between the solid inorganic sealant composition and the frame is sealed between the solid inorganic sealant composition and the frame, such that the heat resistant fibrous material is not directly exposed to the downstream side of the filter assembly.

7. High efficiency air filter assembly according to claim 1, wherein the heat resistant fibrous material arranged between the flat panel sides of the filter core and the frame are enveloped by the unitary sheet of air-permeable filter media, such that the heat resistant fibrous material is not directly exposed to the downstream side of the filter assembly.

8. High efficiency air filter assembly according to claim 1, wherein the flexible liner is comprised of a sheet of HEPA filter media.

9. High efficiency air filter assembly according to claim 1, wherein the air filter assembly is HEPA class H13 or higher according to European Norm EN 1822:2009.

10. High efficiency air filter assembly according to claim 9, wherein the air filter assembly is capable of maintaining a HEPA class of H13 or higher according to European Norm EN 1822:2009, over an extended period of use at temperatures in the range 200-500° C.

11. High efficiency air filter assembly according to claim 1, wherein the box-like metal frame comprises:

a pair of substantially identical, rectangular side casings having a recess configured to receive a flat panel side of the filter core and having a lip of lesser width than said side casings extending outwardly from each end thereof, and a pair of substantially identical, rectangular end casings having a width equal to the width of said side casings and having a recess configured to receive a zig-zag side of the filter core.

12. High efficiency air filter assembly according to claim 1, wherein the recesses of the box-like metal frame have substantially smooth inner surfaces.

13. High efficiency air filter assembly according to claim 1, wherein the length of the lips of the side casings substantially corresponds to the depth of the recesses of the end casings.

14. High efficiency air filter assembly according to claim 1, wherein the box-like metal frame is formed of stainless steel.

15. High efficiency air filter assembly according to claim 1, wherein the box-like metal frame comprises a reinforcement structure, said reinforcement structure comprising a first unitary rectangular plate arranged around the periphery of the upstream side of the filter assembly and fixed to all four sides of the metal frame such that torsional deformation of the metal frame is prevented.

16. High efficiency air filter assembly according to claim 1, wherein the box-like metal frame comprises a reinforcement structure, said reinforcement structure comprising a second unitary rectangular plate arranged around the periphery of the downstream side of the filter assembly and fixed to all four sides of the metal frame such that torsional deformation of the metal frame is prevented.

17. High efficiency air filter assembly according to claim 16, wherein the box-like metal frame comprises a reinforcement structure, said reinforcement structure comprising a first unitary rectangular plate arranged around the periphery of the upstream side of the filter assembly and fixed to all four sides of the metal frame such that torsional deformation of the metal frame is prevented, and wherein the box-like metal frame comprises a reinforcement structure, said reinforcement structure further comprising at least two reinforcement bars arranged at different sides of the metal frame, each reinforcement bar extending between, and being rigidly fixed to, the first and second unitary rectangular plates.

18. High efficiency air filter assembly according to claim 17, wherein the reinforcement bars are arranged in the area of the support frame where load is to be applied when the filter is clamped in a filter housing.

19. High efficiency air filter assembly according to claim 15, wherein the inner edges of the first and/or second unitary rectangular plate at least cover any compressible heat resistant fibrous material and solid inorganic sealant composition arranged between the filter core and the frame.

20. High efficiency air filter assembly according to claim 19, wherein the inner edges of the first and/or second unitary rectangular plate are flanged towards the upstream side or downstream side of the filter assembly respectively, such that a continuous channel is formed between said flanged inner edges and the periphery of the upstream side or downstream side of the filter assembly.

21. A method for manufacturing a high efficiency air filter assembly for high temperature applications comprising:

(a) providing a filter core including a unitary sheet of air-permeable media folded in accordion fashion to form a plurality of side-by-side pleats with zig-zag edges on two opposite sides and flat panels on the other two sides, and a spacer member between opposing walls of successive pleats;

(b) providing a first rectangular end casing having a recess configured to receive a zig-zag side of the filter core;

(c) providing a flexible liner in the recess of the first rectangular end casing;

(d) providing a compressible heat resistant fibrous material in the recess of the first rectangular end casing;

(e) substantially filling said recess of said first rectangular end casing with an inorganic sealant composition in a liquid state, hardenable to a solid state, whereby the flexible liner prevents direct contact between the liquid inorganic sealant composition and the frame;
(f) inserting said filter core into the recess of said first rectangular end casing such that a first zig-zag edge of the filter core is fully immersed in said inorganic sealant; and
(g) allowing the inorganic sealant in said first rectangular end casing to harden to a substantially solid state.

22. A method for manufacturing a high efficiency air filter assembly for high temperature applications comprising:
(a) providing a filter core including a unitary sheet of air-permeable media folded in accordion fashion to form a plurality of side-by-side pleats with zig-zag edges on two opposite sides and flat panels on the other two sides, and a spacer member between opposing walls of successive pleats;
(b) providing a pair of substantially identical, rectangular side casings having a recess configured to receive a flat panel side of the filter core and having a lip of lesser width than said side casings extending outwardly from each end thereof;
(c) providing a pair of substantially identical, rectangular end casings having a width equal to the width of said side casings and having a recess configured to receive a zig-zag side of the filter core;
(d) providing a compressible heat resistant fibrous material in the recesses of the side casings;
(e) arranging the side casings on the flat panel sides of the filter core such that an air tight engagement is formed between the side casing and the flat panel side of the filter core by the compressible heat resistant fibrous material;
(f) providing a flexible liner in the recess of a first end casing and on a first pair of lips of the side casings;
(g) providing a compressible heat resistant fibrous material in the recess of the first end casing;
(h) substantially filling said recess of said first end casing with an inorganic sealant composition in a liquid state, hardenable to a solid state, whereby the flexible liner prevents direct contact between the liquid inorganic sealant composition and the frame;
(i) inserting said filter core and first pair of lips of the side casings into the recess of said first end casing such that a first zig-zag edge of the filter core is fully immersed in said inorganic sealant;
(j) allowing the inorganic sealant in said first end casing to harden to a substantially solid state;
(k) providing a flexible liner in the recess of a second end casing and on a second pair of lips of the side casings;
(l) providing a compressible heat resistant fibrous material in the recess of the second end casing;
(m) substantially filling said recess of said second end casing with the liquid inorganic sealant composition, whereby the flexible liner prevents direct contact between the liquid inorganic sealant composition and the frame;
(n) inserting said filter core and second pair of lips of the side casings into the recess of said second end casing such that a second zig-zag edge of the filter core is fully immersed in said inorganic sealant; and
(o) allowing the inorganic sealant in said first and second end casing to harden to a solid state.

23. A method according to claim 21, wherein the unitary sheet of air-permeable media consists of a binder-free glass fiber filter media or a binder-free mineral fiber filter media and the binder-free glass fiber filter media or the binder-free mineral fiber filter media is a glass fiber filter media made of binder-free borosilicate glass fiber.

24. Use of a high efficiency air filter assembly according to claim 1 in a high temperature application, wherein the filter assembly is repeatedly or continuously heated to a temperature in the range of 200-500° C.

25. High efficiency air filter assembly according to claim 1, wherein the unitary sheet of air-permeable filter media consists of a binder-free glass fiber filter media or a binder-free mineral fiber filter media.

26. A method according to claim 22, wherein the unitary sheet of air-permeable media consists of a binder-free glass fiber filter media or a binder-free mineral fiber filter media.

\* \* \* \* \*